Figure 1:
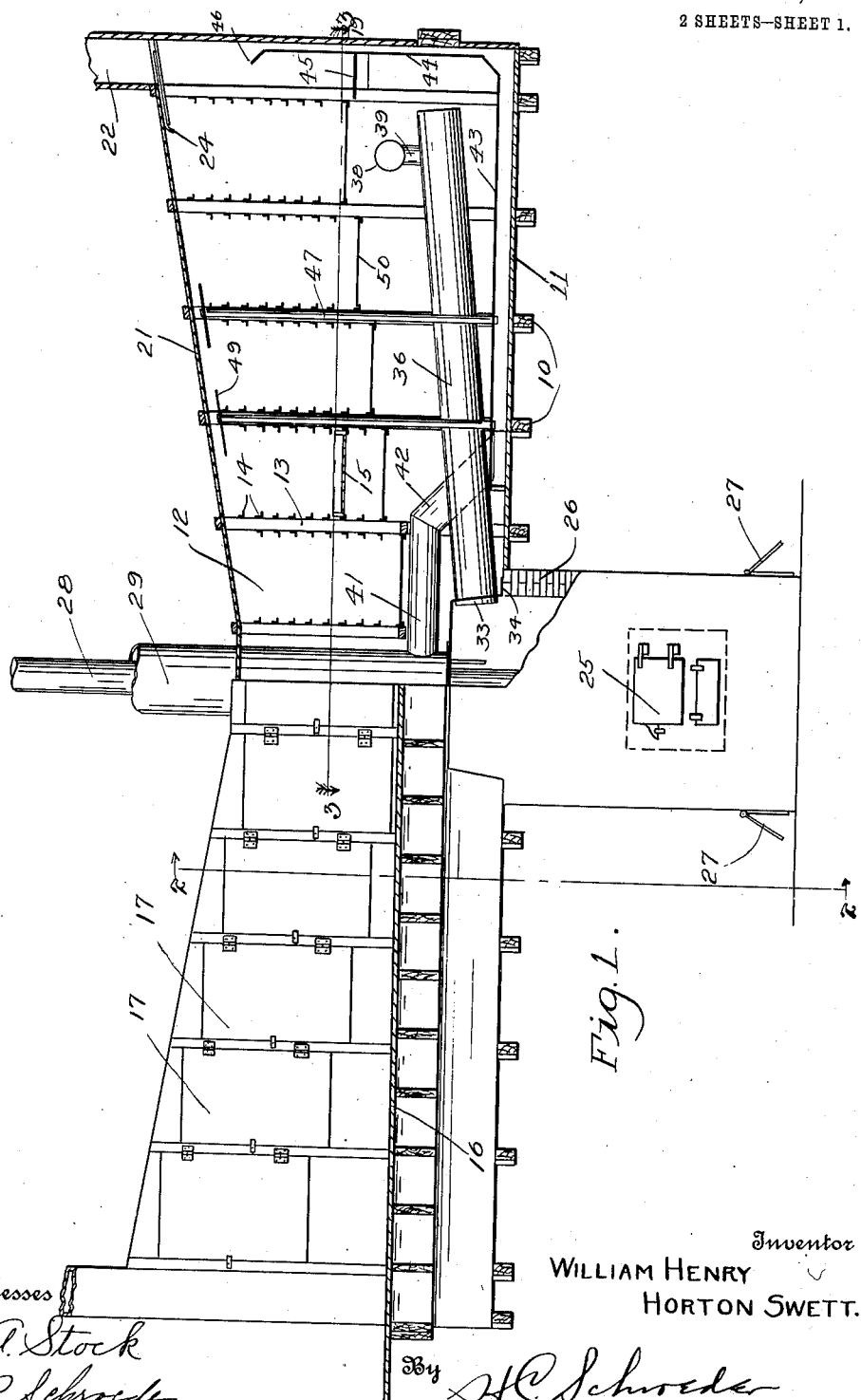

W. H. H. SWETT.
FRUIT DRIER.
APPLICATION FILED OCT. 31, 1911.

1,044,288.

Patented Nov. 12, 1912.

2 SHEETS—SHEET 1.

Witnesses
H. A. Stock
F. P. Schroeder

Inventor
WILLIAM HENRY
HORTON SWETT.

By H. P. Schroeder
his Attorney

W. H. H. SWETT.
FRUIT DRIER.
APPLICATION FILED OCT. 31, 1911.
1,044,288.
Patented Nov. 12, 1912.
2 SHEETS—SHEET 2.
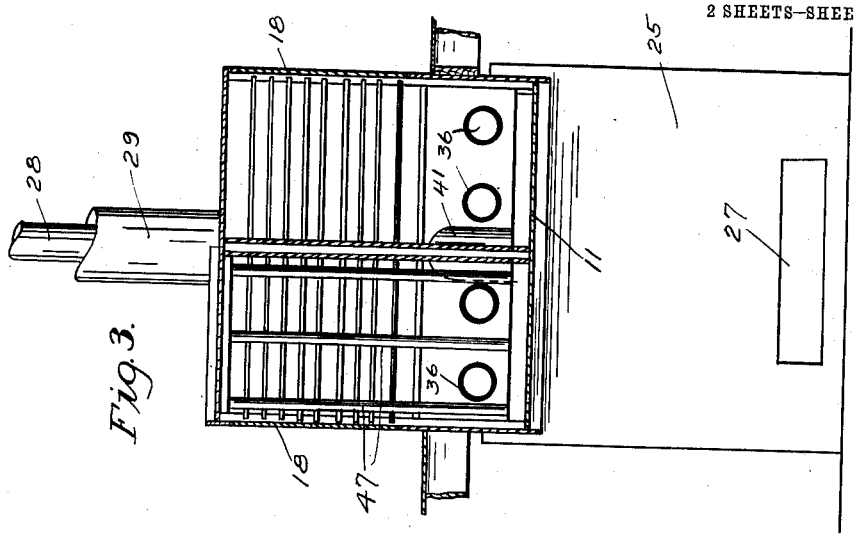
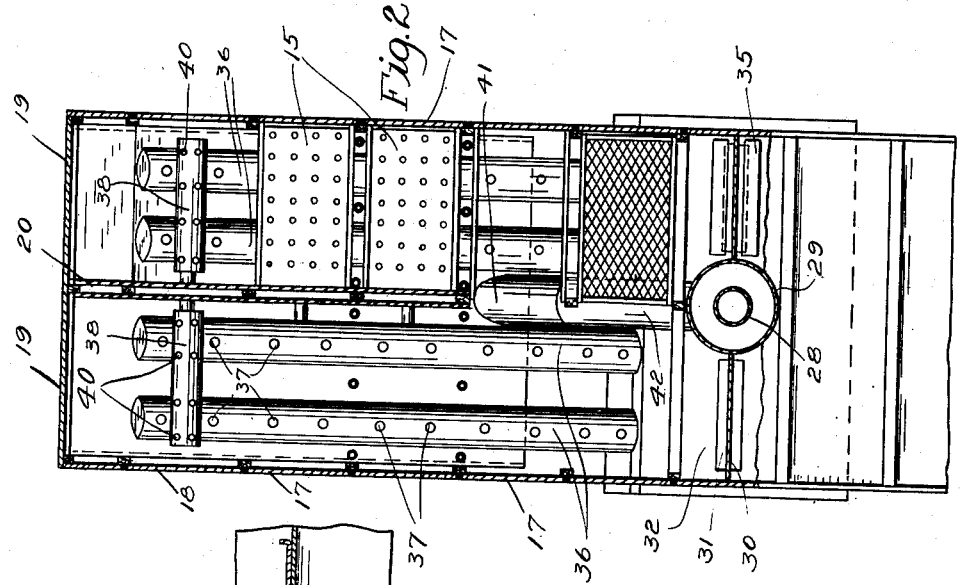
Witnesses
H. A. Stock.
F. P. Schroeder.
Inventor
WILLIAM HENRY
HORTON SWETT.
By A. C. Schroeder
his Attorney

UNITED STATES PATENT OFFICE.

WILLIAM HENRY HORTON SWETT, OF BERKELEY, CALIFORNIA, ASSIGNOR TO CALIFORNIA LIKFRESH COMPANY, OF OAKLAND, CALIFORNIA, A CORPORATION OF CALIFORNIA.

FRUIT-DRIER.

1,044,288.  Specification of Letters Patent.  Patented Nov. 12, 1912.

Application filed October 31, 1911. Serial No. 658,403.

*To all whom it may concern:*

Be it known that I, WILLIAM HENRY HORTON SWETT, a citizen of the United States, residing at Berkeley, in the county of Alameda and State of California, have invented certain new and useful Improvements in Fruit-Driers, of which the following is a specification.

This invention relates to devices for preparing evaporated fruits and has special reference to a novel form of drying oven adapted for utilization in the drying of fruit.

The principal object of the invention is to improve the construction of the oven so that a better and more uniform distribution of the currents of hot air may be obtained.

With the above and other objects in view the invention consists in general of certain novel details of construction and combinations of parts hereinafter fully described, illustrated in the accompanying drawings, and specifically claimed.

In the accompanying drawings, like characters of reference indicate like parts in the several views, and: Figure 1 is a side elevation of a drier constructed in accordance with this invention, one half of the device being shown in section better to show the interior thereof. Fig. 2 is a partial section on the line 2—2, Fig. 1. Fig. 3 is a section on the line 3—3, Fig. 1. Fig. 4 is a detail view of certain valves used in connection herewith.

The oven constructed in accordance with this invention is preferably symmetrical, consisting of two wings or bays extending in opposite directions. Each of these bays is supported on floor timbers 10 whereon rest the bottom 11 of the oven. Each bay is divided into a number of compartments 12 by means of vertical struts 13 carrying tray slides 14 for the purpose of supporting trays 15 having perforated bottoms whereon the fruit to be dried may be placed. A working floor is built as at 16, preferably above the bottom 11 and is thus constructed in order to give access to a series of doors 17, there being one door for each of the compartments. Each wing is provided with vertically disposed side walls 18 and an end wall 19. The wings are separated longitudinally into two compartments by longitudinally extending partitions 20. Carried on the side walls and partitions 20 are the wing tops 21 which slant from the center of the device upwardly and terminate in a flue 22 provided with a suitable gate 24 whereby the flow of heated air through the flue may be regulated.

Beneath the center of the device there is provided a suitable heating furnace of any preferred description which is here indicated at 25, and this furnace is surrounded by a casing 26 having ventilating valves or doors 27 adjacent its bottom to admit cold air. Extending upward from the furnace 25 is a smoke pipe 28 around which is concentrically disposed a second pipe or drum 29.

Between the drum 29 and the side walls 18 extend partitions 30 which serve to divide one bay from the other. Beneath each of these partitions 30 an opening 31 is provided in a false floor 32, which has downwardly extending sides 33 provided with feet 34 which rest on the walls of the casing 26. Slidably mounted on the false floor 32 so as to cover the openings 31 are valves 35 which have downwardly depending edges 36' hanging through the respective openings 31. One of these valves is provided for each side of the partition so that there are four valves in all. The sides 33 are provided with a series of perforations wherethrough extend upwardly inclined pipes 36, each having a series of openings 37 in its upper side and closed upper ends. Adjacent the upper ends of these pipes are manifolds 38 connected to the pipes in each compartment by nipples 39. These manifolds are also provided with a series of openings 40 in their upper portions and have closed ends.

At a point just above the floor 32 the drum 29 has connected thereto pipes 41 which extend laterally outward and then bend downward as at 42 to open beneath a false floor 43 spaced somewhat above the floor 11. This false floor 43 terminates in a partition 44 spaced closely adjacent the end wall 19 of the wing. On this partition 44 is a baffle 45 and the upper end of the partition is bent inward as indicated at 46.

Extending upward from the false floor are a series of pipes 47. These pipes terminate short of the top 21 and on each pipe there is provided a baffle plate 49 spaced slightly beneath the roof or top 21. These baffle plates are for the purpose of distributing the air as it rises between the pipes and struts. Over the pipes 36 there is provided a series of screens 50 so that if any fruit be spilled from the trays it will not fall in between the pipes.

It will be noted that the baffle 45 is of such a width that air striking against it will be deflected below the outermost screen 50 so that it can pass up through the screen and flow through the fruit in the trays above. Furthermore the perforations in these screens 50 are so distributed that the rising heated air will flow evenly throughout the entire drier.

The drier is operated by filling the trays with fruit and placing them on the tray slides. The furnace is then started and the dampers opened when the heated air will flow through the pipes 36 and pass upward through the openings 37 and the openings 40 in the manifolds 38 being evenly distributed by the screens 50. Now if the damper 24 be opened the flow of heated air will be directly upward along the roof and out through the flue 22, the openings in the screens 50 having a united area equal to the area of that of the flue. If, however, the valves 35 be opened the draft produced through the drum 29 will create suction beneath the false floor 43 and a portion of the heated air will be drawn downward behind the partition 44 and pass out through the pipes 41 and 42 and up the drum. By this means a constant and steady flow of moisture laden air is obtained through the flues 22 and 29 and this is constantly replaced by dry heated air through the pipes 36. In consequence of this a uniform and extremely rapid drying takes place and the fruit thus dried is practically free from moisture. There has thus been provided a simple and efficient device of the kind described and for the purpose specified.

Having thus described the invention what is claimed as new, is:—

1. In a fruit drier, a drying chamber having an upwardly inclined roof and a valve controlled flue at its upper end, a false floor in said drying chamber, a partition extending upward from said false floor and spaced from the end of the drying chamber, heater pipes having perforated upper sides extending into said chamber above said false floor, and means for inducing a draft from beneath said false floor whereby air from the heater pipes will be caused to pass between the partition and end of the chamber.

2. In a fruit drier, a drying chamber having an upwardly inclined roof provided with an opening at its upper end, a flue wherewith said opening communicates, tray supports in said chamber, and baffle plates extending parallel to the roof and carried on certain of said tray supports.

3. In a fruit drier, a furnace, a casing surrounding said furnace in its lower end, drying chambers extending in opposite directions from said casing, a false floor at the bottom of said drying chamber forming a top for the chamber within the casing, a smoke pipe extending upward from said furnace, a drum surrounding said smoke pipe and resting on said false floor, said false floor being provided with valve controlled openings, partitions extending from the drum to the sides of the chambers to divide the chambers from one another, hot air pipes extending from the chamber within the casing into each of said drying chambers and provided with openings to permit the escape of hot air into said chambers, a false floor in each of said chambers terminating short of the end remote from the drum, and partitions extending upward from the termination of said false floor, tray supports within each of said chambers, baffle plates carried by the upper ends of certain of said supports, and a valve controlled flue leading from each of said chambers.

In testimony whereof I affix my signature in presence of two witnesses.

WILLIAM HENRY HORTON SWETT.

Witnesses:
F. P. SCHROEDER,
W. A. STOCK.